(12) United States Patent
Tang et al.

(10) Patent No.: US 11,668,980 B2
(45) Date of Patent: Jun. 6, 2023

(54) LIQUID-CRYSTAL MODULE AND SPATIAL LIGHT MODULATOR

(71) Applicant: Hubei Yangtze Industrial Innovation Center Of Advanced Display Co., Ltd., Wuhan (CN)

(72) Inventors: Shihao Tang, Shanghai (CN); Yang Zeng, Shanghai (CN); Feng Lu, Shanghai (CN); Qijun Yao, Shanghai (CN); Yaodong Wu, Shanghai (CN); Ziyu Shi, Shanghai (CN); Yaqi Kuang, Shanghai (CN)

(73) Assignee: HUBEI YANGTZE INDUSTRIAL INNOVATION CENTER OF ADVANCED DISPLAY CO., LTD., Wuhan (CN)

( * ) Notice: Subject to any disclaimer, the term of this patent is extended or adjusted under 35 U.S.C. 154(b) by 0 days.

(21) Appl. No.: 17/124,618

(22) Filed: Dec. 17, 2020

(65) Prior Publication Data

US 2022/0146875 A1 May 12, 2022

(30) Foreign Application Priority Data

Nov. 9, 2020 (CN) .......................... 202011242552.5

(51) Int. Cl.
*G02F 1/1339* (2006.01)
*G02F 1/1347* (2006.01)
(Continued)

(52) U.S. Cl.
CPC ........ *G02F 1/13394* (2013.01); *G02F 1/1347* (2013.01); *G02F 1/13396* (2021.01);
(Continued)

(58) Field of Classification Search
CPC .. G02F 1/1347; G02F 1/1339; G02F 1/13394; G02F 1/13396; G09G 2300/023
See application file for complete search history.

(56) References Cited

U.S. PATENT DOCUMENTS

| | | | |
|---|---|---|---|
| 2007/0085484 A1* | 4/2007 | Hsu ...................... | G09G 3/3622 |
| | | | 313/500 |
| 2016/0291393 A1* | 10/2016 | Han ...................... | G02F 1/1341 |
| 2018/0217424 A1* | 8/2018 | Murakoso ......... | G02F 1/133514 |

FOREIGN PATENT DOCUMENTS

| | | |
|---|---|---|
| CN | 101373300 A | 2/2009 |
| CN | 106970491 A | 7/2017 |

(Continued)

OTHER PUBLICATIONS

English language translation of Chinese Patent Application publication CN 202010459711; translation downloaded from Espacenet at worldwide.espacenet.com on Apr. 8, 2022; translation into English obtained from Google Translate tool on website. (Year: 2020).*

*Primary Examiner* — Angela K Davison
(74) *Attorney, Agent, or Firm* — Anova Law Group, PLLC

(57) ABSTRACT

A spatial light modulator and a liquid-crystal module are provided. The spatial light modulator includes a first liquid-crystal module and a second liquid-crystal module that are arranged opposite to each other. The first liquid-crystal module includes a first array substrate, a first color filter substrate, and a plurality of first spacers disposed therebetween. The second liquid-crystal module includes a second array substrate, a second color filter substrate, and a plurality of second spacers disposed therebetween. The first array substrate, the first color filter substrate, the second color filter substrate, and the second array substrate are stacked sequentially. At least one first spacer forms a first overlapped unit, and at least one second spacer forms a second over- (Continued)

lapped unit. An orthographic projection of the first overlapped unit on the first array substrate fully overlaps an orthographic projection of the second overlapped unit on the first array substrate.

13 Claims, 9 Drawing Sheets

(51) Int. Cl.
*G02F 1/1335* (2006.01)
*C09K 11/02* (2006.01)
(52) U.S. Cl.
CPC .. *G02F 1/133512* (2013.01); *G02F 1/133514* (2013.01); *C09K 11/02* (2013.01)

(56) References Cited

FOREIGN PATENT DOCUMENTS

| | | | |
|---|---|---|---|
| CN | 110346941 A | 10/2019 | |
| CN | 110989258 A | 4/2020 | |
| CN | 111505850 A | 8/2020 | |

\* cited by examiner

LIQUID-CRYSTAL MODULE AND SPATIAL LIGHT MODULATOR

CROSS-REFERENCE TO RELATED APPLICATION

This application claims the priority of Chinese patent application No. 202011242552.5, filed on Nov. 9, 2020, the entirety of which is incorporated herein by reference.

FIELD

The present disclosure generally relates to the field of display technology and, more particularly, relates to a liquid-crystal module and a spatial light modulator.

BACKGROUND

Electronic devices with a display function are widely used in daily life and work, and have become indispensable essential tools. To meet demands for stereo display (3D display) of a display device, holographic 3D display has become a major development trend in the current display field. The holographic 3D display device needs to modulate phase and amplitude of the coherent light through a spatial light modulator (SLM), to achieve the holographic 3D display.

The spatial light modulator includes two liquid-crystal modules that are arranged opposite to each other, and is configured to perform phase modulation and amplitude modulation of incident linearly polarized light. Spacers of the two liquid-crystal modules in the existing spatial light modulator will affect the alignment uniformity of the surrounding alignment layer, and cause a non-uniform display. The disclosed liquid-crystal module and spatial light modulator are directed to solve one or more problems set forth above and other problems.

SUMMARY

One aspect of the present disclosure provides a spatial light modulator. The spatial light modulator includes a first liquid-crystal module and a second liquid-crystal module that are arranged opposite to each other. The first liquid-crystal module includes a first array substrate, a first color filter substrate, and a plurality of first spacers disposed between the first array substrate and the first color filter substrate. The second liquid-crystal module includes a second array substrate, a second color filter substrate, and a plurality of second spacers disposed between the second array substrate and the second color filter substrate. The first array substrate, the first color filter substrate, the second color filter substrate, and the second array substrate are stacked sequentially. At least one first spacer of the plurality of first spacers forms a first overlapped unit, and at least one second spacer of the plurality of second spacers forms a second overlapped unit. An orthographic projection of the first overlapped unit on the first array substrate fully overlaps an orthographic projection of the second overlapped unit on the first array substrate.

Another aspect of the present disclosure provides a liquid-crystal module. The liquid-crystal module includes an array substrate, a color filter substrate, and a plurality of spacers disposed between the array substrate and the color filter substrate. The plurality of spacers include one or more main spacers and one or more auxiliary spacers, and a main spacer of the one or more main spacers has a height greater than an auxiliary spacer of the one or more auxiliary spacers. An orthographic projection of the color filter substrate on the array substrate is symmetrical with respect to a first axis, and orthographic projections of the one or more main spacers on the array substrate are symmetrical with respect to the first axis.

Another aspect of the present disclosure provides a liquid-crystal module. The liquid-crystal module includes an array substrate, a color filter substrate, and a plurality of spacers disposed between the array substrate and the color filter substrate. The plurality of spacers include one or more main spacers and one or more auxiliary spacers, and a main spacer of the one or more main spacers has a height greater than an auxiliary spacer of the one or more auxiliary spacers. An orthographic projection of the color filter substrate on the array substrate is symmetrical with respect to a first axis, and orthographic projections of the one or more auxiliary spacers on the array substrate are symmetrical with respect to the first axis.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

It should be noted that relational terms such as first and second may be merely used to distinguish one entity or operation from another entity or operation, and may not require or imply that such entities or operations have any actual relationship or order. Moreover, the terms "include", "contain" or any variant may be intended to cover non-exclusive inclusion, such that a process, a method, an article, or a device that includes a series of elements may not only include such elements, but also include any other element that is not clearly listed, or may include elements inherent to such process, method, article or device. In a case without more restrictions, the element defined by the sentence "including . . . " may not exclude the existence of any other same element in the process, method, article, or device that includes the element.

In addition, it is also necessary to understand that in the context, when an element is referred to as being formed "over" or "under" another element, the element can not only be directly formed "on" or "under" the another element, but also can be indirectly formed "over" or "under" the another element through an intermediate element.

Figure 1:
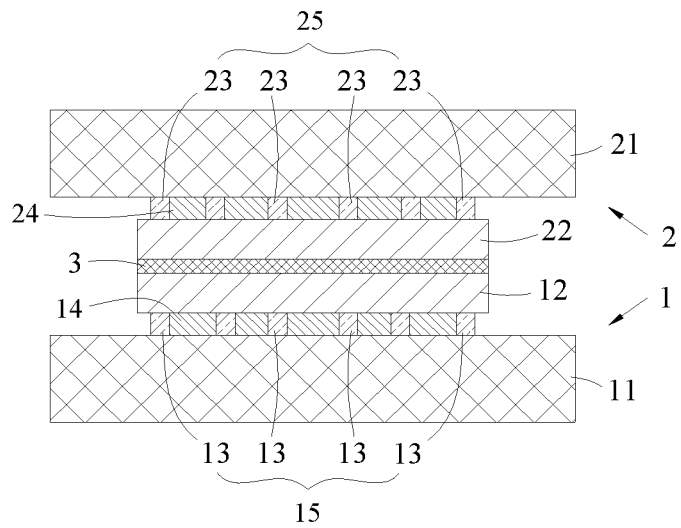
FIG. 1 illustrates a schematic diagram of an exemplary spatial light modulator consistent with disclosed embodiments of the present disclosure.

FIG. 1 illustrates a schematic diagram of a spatial light modulator consistent with various disclosed embodiments. Referring to FIG. 1, the spatial light modulator may include a first liquid-crystal module 1 and a second liquid-crystal module 2 that are arranged opposite to each other. One of the first liquid-crystal module 1 and the second liquid-crystal module 2 may be configured to perform phase modulation, and the other one of the first liquid-crystal module 1 and the second liquid-crystal module 2 may be configured to perform amplitude modulation.

The first liquid-crystal module 1 may include a first array substrate 11, a first color filter substrate 12, and a plurality of first spacers 13 disposed between the first array substrate 11 and the first color filter substrate 12. The second liquid-crystal module 2 may include a second array substrate 21, a second color filter substrate 22, and a plurality of second spacers 23 disposed between the second array substrate 21 and the second color filter substrate 22. The first array substrate 11, the first color filter substrate 12, the second color filter substrate 22, and the second array substrate 21 may be sequentially stacked. The direction in which the first array substrate 11, the first color filter substrate 12, the second color filter substrate 22, and the second array substrate 21 are stacked may be parallel to an optical path direction. In one embodiment, light may enter from the first array substrate 11 and may exit from the second array substrate 21. In another embodiment, light may enter from the second array substrate 21 and may exit from the first array substrate 11.

The first liquid-crystal module 1 may further include a first liquid-crystal layer 14, and the first liquid-crystal layer 14 may be disposed between the first array substrate 11 and the first color filter substrate 12. The first spacers 13 may separate the first array substrate 11 and the first color filter substrate 12, to form a gap for accommodating the first liquid-crystal layer 14 between the first array substrate 11 and the first color filter substrate 12. The first spacers 13 may maintain the thickness uniformity of the first liquid-crystal layer 14 between the first array substrate 11 and the first color filter substrate 12, and may reduce the non-uniform display caused by the non-uniform thickness of the first liquid-crystal layer 14.

The second liquid-crystal module 2 may further include a second liquid-crystal layer 24, and the second liquid-crystal layer 24 may be disposed between the second array substrate 21 and the second color filter substrate 22. The second spacers 23 may separate the second array substrate 21 and the second color filter substrate 22, to form a gap for accommodating the second liquid-crystal layer 24 between the second array substrate 21 and the second color filter substrate 22. The second spacers 23 may maintain the thickness uniformity of the second liquid-crystal layer 24 between the second array substrate 21 and the second color filter substrate 22, and may reduce the non-uniform display caused by the non-uniform thickness of the second liquid-crystal layer 24.

The first liquid-crystal layer 14 and the second liquid-crystal layer 24 each may include a plurality of liquid-crystal molecules. In certain embodiments, the liquid-crystal molecule may have a rod-like structure.

At least one first spacer 13 may form a first overlapped unit 15, and at least one second spacer 23 may form a second overlapped unit 25. An orthographic projection of the first overlapped unit 15 on the first array substrate 11 may fully overlap the orthographic projection of the second overlapped unit 25 on the first array substrate 11.

In the disclosed spatial light modulator, the first overlapped unit 15 may overlap the second overlapped unit 25 in the optical path direction, which may reduce a total area of orthographic projections of entire spacers (both the first spacers and the second spacers) on a plane perpendicular to the optical path direction, may further reduce an area of the non-uniform display region caused by the influence of the spacers (the area may refer to an area of the non-uniform display region in the plane perpendicular to the optical path direction), and may improve the display effect.

It should be noted that "fully overlap" may not require complete overlap in the strict sense, and may be within the allowable error range. In the process of assembling the first liquid-crystal module 1 and the second liquid-crystal module 2, the deviation of the orthographic projection of the first overlapped unit 15 on the first array substrate 11 and the orthographic projection of the second overlapped unit 25 on the first array substrate 11 may be within approximately 10 which may be referred to fully overlap.

In certain embodiments, a first alignment layer may be disposed between the first array substrate 11 and the first color filter substrate 12, and a second alignment layer may be disposed between the second array substrate 21 and the second color filter substrate 22. The alignment layer (e.g., the first alignment layer or the second alignment layer) may enable the surrounding liquid-crystal molecules to maintain a specific orientation, such that the liquid-crystal molecules may maintain the orientation without electric field. The first spacer 13 (second spacer 23) may affect the alignment uniformity of the surrounding first alignment layer (second alignment layer), such that non-uniform display may occur in a region around the first spacer 13 (second spacer 23) due to the random alignment. In the present disclosure, through configuring the first overlapped unit 15 to fully overlap the second overlapped unit 25 in the optical path direction, the area of the non-uniform display region due to the influence of the spacer (e.g., the first spacer or the second spacer) may be reduced, thereby improving the display effect.

In certain embodiments, the first color filter substrate 12 and the second color filter substrate 22 may be connected by an optical adhesive layer 3 disposed therebetween. In another embodiment, the first color filter substrate 12 and the second color filter substrate 22 may be connected by any other mechanical structure, which may not be limited by the present disclosure.

In certain embodiments, a quantity of the first spacers 13 for forming the first overlapped unit 15 may be more than one, and a quantity of the second spacers 23 for forming the second overlapped unit 25 may be more than one. The quantity of the first spacers 13 of the first overlapped unit 15 may be equal to the quantity of the second spacers 23 of the second overlapped unit 25, and the first spacers 13 of the first overlapped unit 15 may correspond to the second spacers 23 of the second overlapped unit 25 one by one. Increasing the quantity of the first spacers 13 of the first overlapped unit 15 and the quantity of the second spacers 23 of the second overlapped unit 25 may effectively reduce the area of the non-uniform display region caused by the influence of the spacer.

Figure 2:
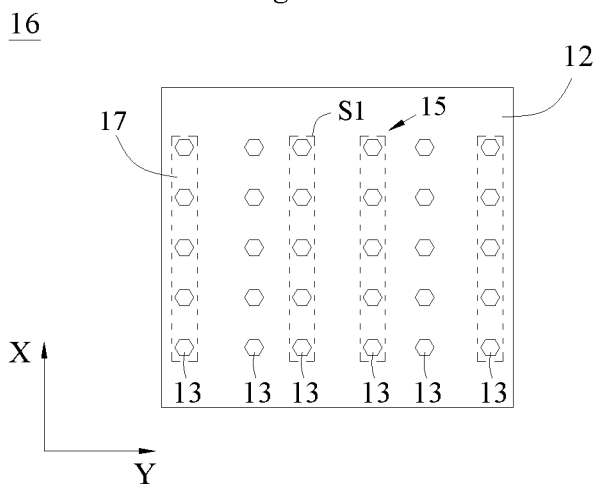
FIG. 2 illustrates a schematic diagram of projections of a first color filter substrate and a first spacer on a first array substrate of an exemplary spatial light modulator consistent with disclosed embodiments of the present disclosure.
Figure 3:
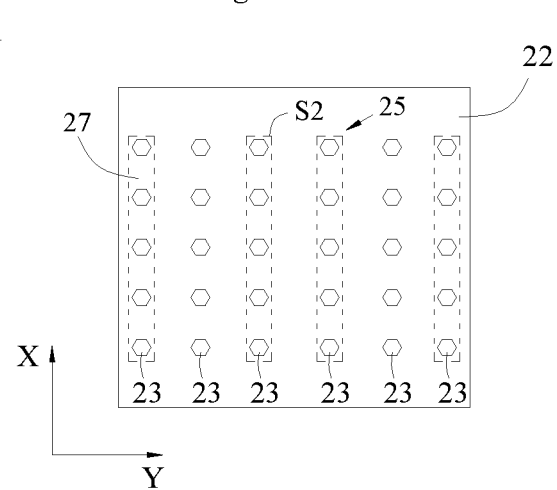
FIG. 3 illustrates a schematic diagram of projections of a second color filter substrate and a second spacer on a first array substrate of an exemplary spatial light modulator consistent with disclosed embodiments of the present disclosure.

FIG. 2 illustrates a schematic diagram of projections of the first color filter substrate and the first spacer on the first array substrate consistent with disclosed embodiments of the present disclosure; and FIG. 3 illustrates a schematic diagram of projections of the second color filter substrate and the second spacer on the first array substrate consistent with disclosed embodiments of the present disclosure.

Referring to FIG. 2, in the process of forming the first liquid-crystal module 1, a plurality of first spacers 13 may be first formed on the first color filter substrate 12 to form a first color filter assembly 16, and then the first color filter assembly 16, the first liquid-crystal layer 14, and the first array substrate 11 may be assembled together. The first spacers 13 in the dashed frame S1 may form the first overlapped unit 15.

In certain embodiments, in the first overlapped unit 15, multiple first spacers 13 may be arranged along a first direction X and form a first spacer row 17. A plurality of first spacer rows 17 may be arranged and spaced apart along a second direction Y. The second direction Y may be perpendicular to the first direction X, and the first direction X and the second direction Y may be perpendicular to the optical path direction. In certain embodiments, some first spacers 13 may also be arranged between the first spacer rows 17. The orthographic projections of such first spacers 13 on the first array substrate 11 may not overlap the orthographic projections of the second spacers 23 on the first array substrate 11.

Referring to FIG. 3, in the process of forming the second liquid-crystal module 2, the plurality of second spacers 23 may be first formed on the second color filter substrate 22, to form a second color filter assembly 26, and then the second color filter assembly 26, the second liquid-crystal layer 24 and the second array substrate 21 may be assembled together. The second spacers 23 in the dashed frame S2 may form the second overlapped unit 25.

When the second liquid-crystal module 2 including the second color filter assembly 26 is connected to the first liquid-crystal module 1 including the first color filter assembly 16, the orthographic projections of the multiple first spacers 23 of the first overlapped unit 15 on the first array substrate 11 may fully overlap the orthographic projections of the multiple second spacers 23 of the second overlapped unit 25 on the first array substrate 11.

In certain embodiments, the quantity of entire first spacers 13 between the first array substrate 11 and the first color filter substrate 12 may be N, and the quantity of the first spacers 13 for forming the first overlapped unit 15 may be M. Both M and N may be positive integers greater than 1, and M may be less than or equal to N.

In certain embodiments, in the second overlapped unit 25, a plurality of second spacers 23 may be arranged along the first direction X to form a second spacer row 27, and a plurality of second spacer rows 27 may be arranged and spaced apart along the second direction Y. In certain embodiments, some second spacers 23 may be arranged between the second spacer rows 27. The orthographic projections of such second spacers 23 on the first array substrate 11 may not overlap the orthographic projections of the first spacers 13 on the first array substrate 11.

Figure 4:
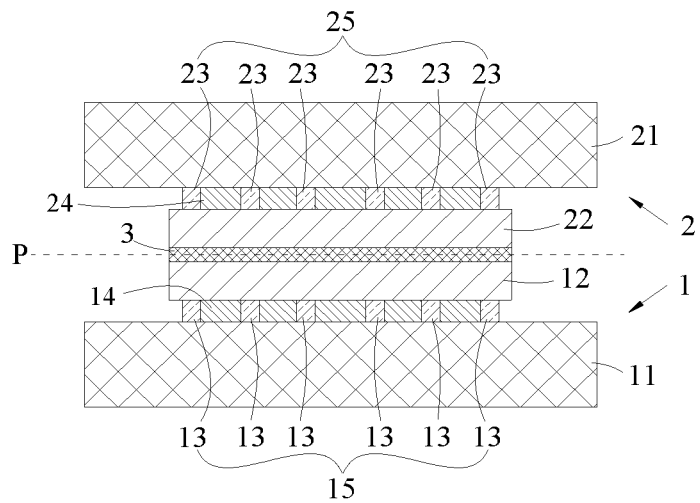
FIG. 4 illustrates a schematic diagram of another exemplary spatial light modulator consistent with disclosed embodiments of the present disclosure.

FIG. 4 illustrates a schematic diagram of another spatial light modulator consistent with disclosed embodiments of the present disclosure. Referring to FIG. 4, a quantity of the first spacers 13 for forming the first overlapped unit 15 may be equal to the quantity of entire first spacers 13 disposed between the first array substrate 11 and the first color filter substrate 12. In view of this, the orthographic projections of entire first spacers 13 on the first array substrate 11 may fully overlap the orthographic projection of the second overlapped unit 25 on the first array substrate 11, thereby reducing the area of the non-uniform display region caused by the influence of the spacers.

In certain embodiments, a quantity of second spacers 23 for forming the second overlapped unit 25 may be equal to the quantity of entire second spacers 23 disposed between the second array substrate 21 and the second color filter substrate 22. In view of this, the quantity of entire first spacers 13 may be equal to the quantity of entire second spacers 23, and the first spacers 13 and the second spacers 23 may be arranged in a one-to-one correspondence in the optical path direction. The orthographic projections of the entire first spacers 13 on the first array substrate 11 may fully overlap the orthographic projections of the entire second spacers 23 on the first array substrate 11. Therefore, the non-uniform display region caused by the influence of the spacers may be minimized.

In certain embodiments, the plurality of first spacers 13 and the plurality of second spacers 23 may be symmetrically arranged with respect to a plane P, and the plane P may be parallel to the first array substrate 11 and may be located right in a middle between the first array substrate 11 and the second array substrate 21. The plane P may be an imaginary plane and may be perpendicular to the optical path direction.

It should be noted that "right in a middle" may not require the exact middle in the strict sense, and may be within the allowable error range.

After the first liquid-crystal module 1 and the second liquid-crystal module 2 are connected together, the first spacers 13 and the second spacers 23 may be arranged in one-to-one correspondence, and the first spacer 13 and the second spacer 23 that are correspondingly arranged may have the same shape and size. The first spacer 13 and the second spacer 23 may be formed using a same mask.

Figure 5:
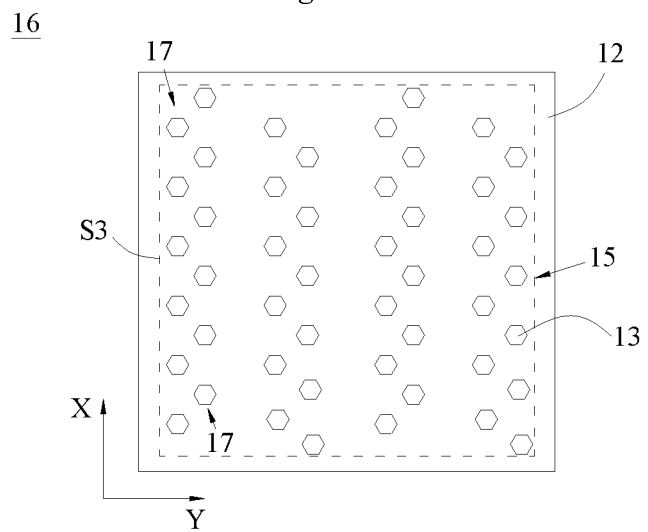
FIG. 5 illustrates a schematic diagram of projections of a first color filter substrate and a first spacer on a first array substrate of another exemplary spatial light modulator consistent with disclosed embodiments of the present disclosure.
Figure 6:
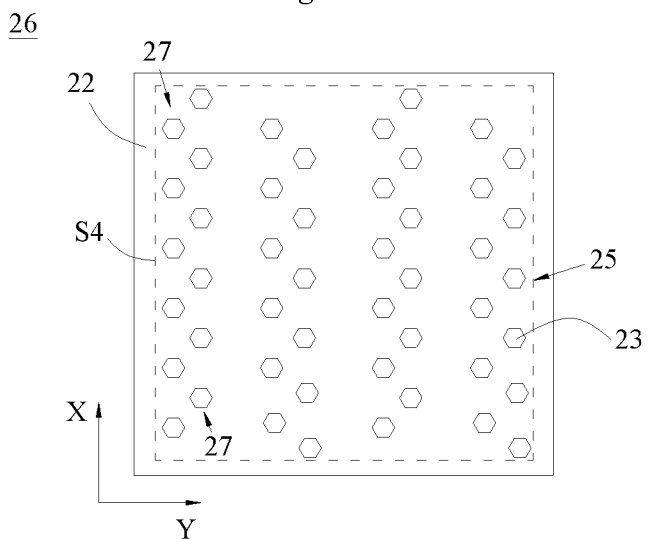
FIG. 6 illustrates a schematic diagram of projections of a second color filter substrate and a second spacer on a first array substrate of another exemplary spatial light modulator consistent with disclosed embodiments of the present disclosure.

FIG. 5 illustrates a schematic diagram of projections of the first color filter substrate and the first spacer on the first array substrate consistent with disclosed embodiments of the present disclosure; and FIG. 6 illustrates a schematic diagram of projections of the second color filter substrate and the second spacer on the first array substrate consistent with disclosed embodiments of the present disclosure.

Referring to FIG. 5, in one embodiment, a quantity of first spacers 13 for forming the first overlapped unit 15 may be equal to the quantity of entire first spacers 13 disposed between the first array substrate 11 and the first color filter substrate 12. The first spacers 13 in the dashed frame S3 may form the first overlapped unit 15.

In the first overlapped unit 15, a plurality of first spacers 13 may be arranged along the first direction X to form the first spacer row 17, and a plurality of first spacer rows 17 may be arranged and spaced apart along the second direction Y. The second direction Y may be perpendicular to the first direction X.

At least part of the first spacers 13 of adjacent two first spacer rows 17 may be staggered along the first direction X. In other words, the orthographic projections of the first spacers 13 of adjacent two first spacer rows 17 on a plane perpendicular to the second direction Y may not overlap. The staggered arrangement of the first spacers 13 may reduce the distribution periodicity of the first spacers 13, thereby reducing the risk of poor macro periodic display. In certain embodiments, the first spacers 13 of any adjacent two first spacer rows 17 may be staggered along the first direction X, to cause the non-uniform distribution of the first spacers 13 as much as possible.

Referring to FIG. 6, in one embodiment, a quantity of second spacers 23 for forming the second overlapped unit 25 may be equal to the quantity of entire second spacers 23 disposed between the second array substrate 21 and the second color filter substrate 22. The second spacers 23 in the dashed frame S4 may form the second overlapped unit 25.

In the second overlapped unit 25, a plurality of second spacers 23 may be arranged along the first direction X to form the second spacer row 27, and a plurality of second spacer rows 27 may be arranged and spaced apart along the second direction Y. The second direction Y may be perpendicular to the first direction X.

At least part of the second spacers 23 of adjacent two second spacer rows 27 may be staggered along the first direction X. In other words, the orthographic projections of the second spacers 23 of adjacent two second spacer rows 27 on the plane perpendicular to the second direction Y may not overlap. The staggered arrangement of the second spacers 23 may reduce the distribution periodicity of the second spacers 23, thereby reducing the risk of poor macro periodic display. In certain embodiments, the second spacers 23 of any adjacent two second spacer rows 27 may be staggered along the first direction X, to cause the non-uniform distribution of the second spacers 23 as much as possible.

Figure 7:
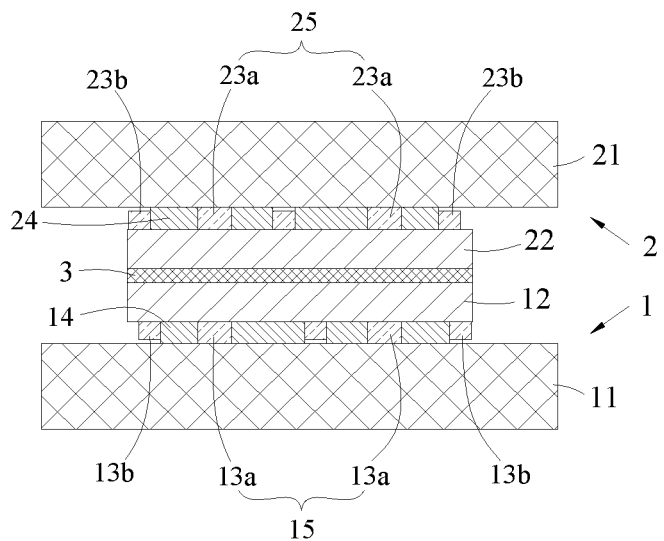
FIG. 7 illustrates a schematic diagram of another exemplary spatial light modulator consistent with disclosed embodiments of the present disclosure.

FIG. 7 illustrates a schematic diagram of another spatial light modulator consistent with disclosed embodiments of the present disclosure. Referring to FIG. 7, the first liquid-crystal module 1 may include a first array substrate 11, a first color filter substrate 12 and a plurality of first spacers disposed between the first array substrate 11 and the first color filter substrate 12. The plurality of first spacers may include one or more first main spacers 13a and one or more first auxiliary spacers 13b, and the first main spacer 13a may have a height greater than the first auxiliary spacer 13b. The first main spacer 13a may be supported between the first array substrate 11 and the first color filter substrate 12 to maintain the thickness uniformity of the first liquid-crystal layer 14 between the first array substrate 11 and the first color filter substrate 12. The first auxiliary spacer 13b may be mainly configured to be supported between the first array substrate 11 and the first color filter substrate 12 when the first liquid-crystal module 1 is pressed, to prevent the first liquid-crystal module 1 from unrecoverable deformation. In certain embodiments, a quantity of the first main spacers 13a may be more than one, and a quantity of the first auxiliary spacers 13b may be more than one.

The first main spacer 13a may have a height greater than the first auxiliary spacer 13b. With respect to the first auxiliary spacer 13b, the first main spacer 13a may have a greater impact on the surrounding alignment layer, and the area of the surrounding non-uniform display region may be larger. Therefore, in certain embodiments, the first overlapped unit 15 may include one or more first main spacers 13a. In view of this, the orthographic projections of the first main spacers 13a of the first overlapped unit 15 on the first array substrate 11 may be located within the orthographic projection of the second overlapped unit 25 on the first array substrate 11, which may effectively reduce the area of the non-uniform display region caused by the influence of the spacer, thereby improving the display effect. In certain embodiments, the first overlapped unit 15 may include the entire first main spacers 13a.

The second liquid-crystal module 2 may include a second array substrate 21, a second color filter substrate 22 and a plurality of second spacers disposed between the second array substrate 21 and the second color filter substrate 22. The plurality of second spacers may include one or more second main spacers 23a and one or more second auxiliary spacers 23b, and the second main spacer 23a may have a height greater than the second auxiliary spacer 23b. The second main spacer 23a may be supported between the second array substrate 21 and the second color filter substrate 22, to maintain the thickness uniformity of the second liquid-crystal layer 24 between the second array substrate 21 and the second color filter substrate 22. The second auxiliary spacer 23b may be mainly configured to be supported between the second array substrate 21 and the second color filter substrate 22 when the second liquid-crystal module 2 is pressed, to prevent the second liquid-crystal module 2 from unrecoverable deformation. In certain embodiments, a quantity of the second main spacers 23a may be more than one, and the quantity of second auxiliary spacers 23b may be more than one.

Correspondingly, the second overlapped unit 25 may include one or more second main spacers 23a. The first main spacers 13a in the first overlapped unit 15 and the second main spacers 23a in the second overlapped unit 25 may be correspondingly arranged.

In certain embodiments, the second overlapped unit 25 may include the entire second main spacers 23a. The quantity of the first main spacers 13a may be equal to the quantity of the second main spacers 23a, and the first main spacer 13a and the second main spacer 23a may have same shape and size.

Figure 8:
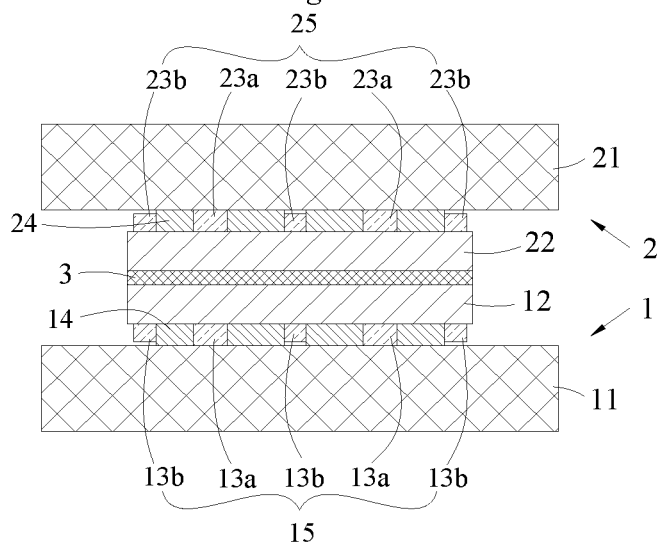
FIG. 8 illustrates a schematic diagram of another exemplary spatial light modulator consistent with disclosed embodiments of the present disclosure.

FIG. 8 illustrates a schematic diagram of another spatial light modulator consistent with disclosed embodiments of the present disclosure. Compared with the spatial light modulator illustrated in FIG. 7, the first overlapped unit 15 of the spatial light modulator illustrated in FIG. 8 may include one or more first auxiliary spacers 13b, to further reduce the area of the non-uniform display region caused by the influence of the spacers, thereby improving the display effect.

In certain embodiments, the first overlapped unit 15 may include the entire first auxiliary spacers 13b, and the orthographic projections of the entire first auxiliary spacers 13b on the first array substrate 11 may be located within the orthographic projection of the second overlapped unit 25 on the first array substrate 11, which may further reduce the area of the non-uniform display region caused by the influence of the spacers, thereby improving the display effect.

Correspondingly, the second overlapped unit 25 may further include one or more second auxiliary spacers 23b. The first auxiliary spacers 13b of the first overlapped unit 15 and the second auxiliary spacers 23b of the second overlapped unit 25 may be correspondingly arranged in an up-down mode. In certain embodiments, the second overlapped unit 25 may include the entire second auxiliary spacers 23b. Optionally, the quantity of the first auxiliary spacers 13b may be equal to the quantity of the second auxiliary spacers 23b, and the first auxiliary spacer 13b and the second auxiliary spacer 23b may have same shape and size.

Figure 9:
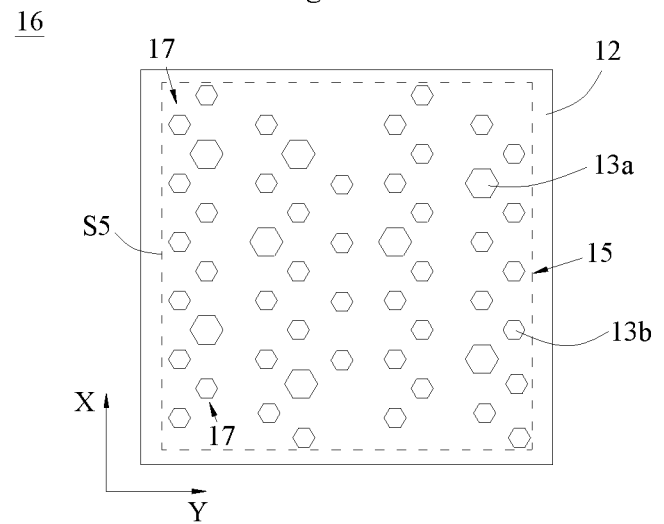
FIG. 9 illustrates a schematic diagram of projections of a first color filter substrate and a first spacer on a first array substrate of another exemplary spatial light modulator consistent with disclosed embodiments of the present disclosure.

FIG. 9 illustrates a schematic diagram of projections of the first color filter substrate and the first spacer on the first array substrate consistent with disclosed embodiments of the present disclosure. Referring to FIG. 9, the first overlapped unit 15 may include the entire first main spacers 13a and the entire first auxiliary spacers 13b. The first main spacers 13a and the first auxiliary spacers 13b in the dashed frame S5 may form the first overlapped unit 15.

In the first overlapped unit 15, a plurality of first spacers may be arranged along the first direction X to form a first spacer row 17, and a plurality of first spacer rows 17 may be arranged and spaced apart along the second direction Y. The second direction Y may be perpendicular to the first direction X. At least part of the first spacers of adjacent two first spacer rows 17 may be staggered along the first direction X.

The first main spacers 13a may be merely distributed in a part of the first spacer rows 17, or may be distributed in each first spacer row 17. The first spacer row 17 including the first main spacers 13a may be simply referred to the first main spacer row (the first main spacer row may further include the first auxiliary spacer 13b). The first main spacers 13a of adjacent two first main spacer rows may be staggered in the first direction X. The staggered arrangement of the first main spacers 13a may reduce the distribution periodicity of the first main spacers 13a, thereby reducing the risk of poor macro periodic display. In certain embodiments, the plurality of first main spacers 13a in the first main spacer row may be arranged and spaced apart along the first direction X.

Figure 10:
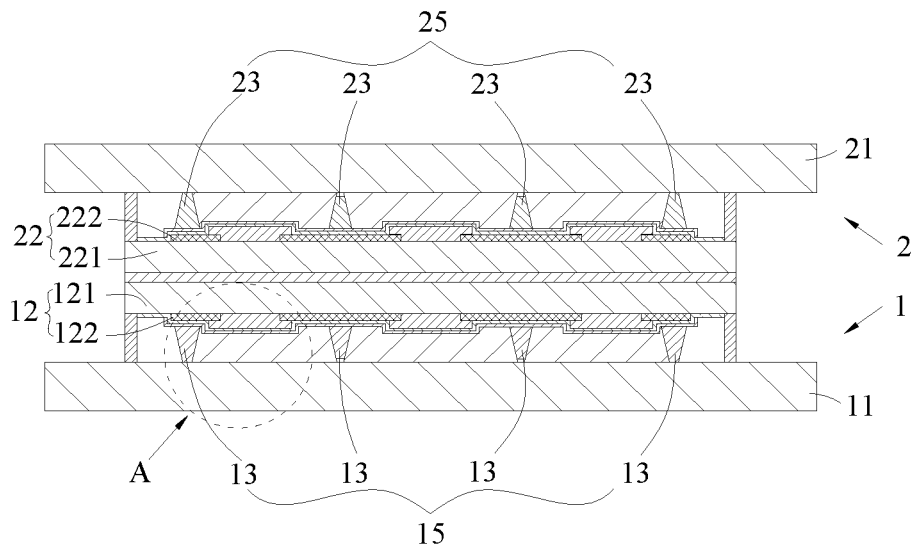
FIG. 10 illustrates a schematic diagram of another exemplary spatial light modulator consistent with disclosed embodiments of the present disclosure.

FIG. 10 illustrates a schematic diagram of another spatial light modulator consistent with disclosed embodiments of the present disclosure. Referring to FIG. 10, the first color filter substrate 12 may include a first substrate 121 and a first black matrix 122. The first black matrix 122 may be disposed on a side of the first substrate 121 facing toward the first array substrate 11, and the plurality of first spacers 13 may be disposed on a side of the first black matrix 122 facing toward the first array substrate 11. The orthographic projections of the plurality of first spacers 13 on the first array substrate 11 may be located within the orthographic projection of the first black matrix 122 on the first array substrate 11. The transmitted light around the first spacer 13 may not be controlled and may not be used for display. The first black matrix 122 may block the light affected by the first spacer 13 to ensure the uniformity of the light emitted from the spatial light modulator. The orthographic projections of the entire first spacers 13 on the first array substrate 11 may be located within the orthographic projections of the first black matrix 122 on the first array substrate 11.

The orthographic projection of a portion of the first liquid-crystal layer 14 in a certain range around the first spacer 13 on the first array substrate 11 may be located within the orthographic projection of the first black matrix 122 on the first array substrate 11. In certain embodiments, the orthographic projection of the portion of the first liquid-crystal layer 14 within a range of 3 μm-10 μm from the first spacer on the first array substrate 11 may be located within the orthographic projection of the first black matrix 122 on the first array substrate 11. The value of the distance range may not be limited by the present disclosure, and may be adjusted adaptively according to product requirements.

In certain embodiments, the orthographic projections of the plurality of second spacers 23 on the first array substrate 11 may be located within the orthographic projection of the first black matrix 122 on the first array substrate 11. The first black matrix 122 may block the light affected by the second spacer 23, to ensure the uniformity of the light emitted from the spatial light modulator.

In certain embodiments, the second color filter substrate 22 may include a second substrate 221 and a second black matrix 222. The second black matrix 222 may be disposed on a side of the second substrate 221 facing toward the second array substrate 21, and the plurality of second spacers 23 may be disposed on a side of the second black matrix 222 facing toward the second array substrate 21. The orthographic projections of entire second spacers 23 on the first array substrate 11 may be located within the orthographic projection of the second black matrix 222 on the first array substrate 11. The second black matrix 222 may block the light affected by the second spacer 23, to ensure the uniformity of the light emitted from the spatial light modulator.

The first overlapped unit 15 and the second overlapped unit 25 may overlap along the optical path direction, such that the light-shielding region of the first black matrix 122 may at least partially overlap the light-shielding region of the second black matrix 222, which may increase the light-emitting amount and improve the display effect.

Figure 11:
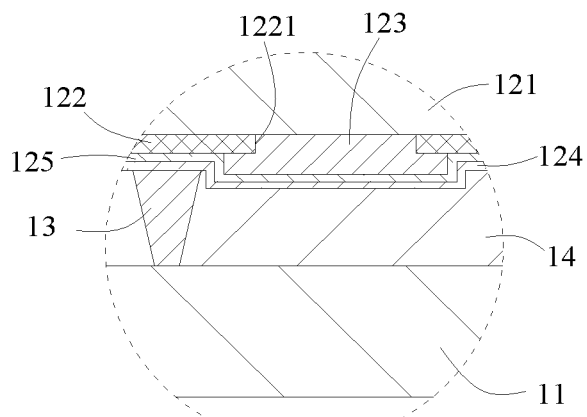
FIG. 11 illustrates a schematic local zoom-in view of a circle A of another exemplary spatial light modulator in FIG. 10 consistent with disclosed embodiments of the present disclosure.

FIG. 11 illustrates a schematic local zoom-in view of a circle A of the spatial light modulator in FIG. 10. Referring to FIG. 11, the first black matrix 122 may have a plurality of pixel openings 1221, and the first color filter substrate 12 may further include a plurality of first color resists 123 covering the plurality of pixel openings 1221. The plurality of first color resists 123 may include a red color resist block corresponding to a red pixel, a green color resist block corresponding to a green pixel, and a blue color resist block corresponding to a blue pixel. After passing through a color resist block, the light may display a corresponding color. In certain embodiments, the plurality of first color resists 123 may have a same thickness.

In certain embodiments, the first color filter substrate 12 may further include a first common electrode layer 124 and a first protection layer 125. The first protection layer 125 may be disposed on a side of the first black matrix 122 facing toward the first array substrate 11, and may cover the first black matrix 122 and the first color resists 123. The first common electrode layer 124 may be disposed on the surface of the first protection layer 125 facing toward the first array substrate 11. The first common electrode layer 124 may be an ITO conductive film. In certain embodiments, the first spacer 13 may be formed on the surface of the first common electrode layer 124 facing toward the first array substrate 11.

The first color resist 123 may have a certain thickness, which may cause the formation of a protruded region on the surface of the first common electrode layer 124. Therefore, in certain embodiments, the orthographic projections of the first color resists 123 on the first substrate 121 and the orthographic projections of the first spacers 13 on the first substrate 121 may be alternately arranged and spaced apart. In view of this, the first spacer 13 may be capable of avoiding the protruded region, and may be arranged on the flat region of the surface of the first common electrode layer 124, thereby ensuring the height consistency of the plurality of first main spacers and the height consistency of the plurality of first auxiliary spacers.

The structure of the second color filter substrate 22 may be almost the same as the structure of the first color filter substrate 12. The second color filter substrate 22 may include a second color resist, a second common electrode layer, and a second protection layer, etc., which may not be described in detail herein.

Figure 12:
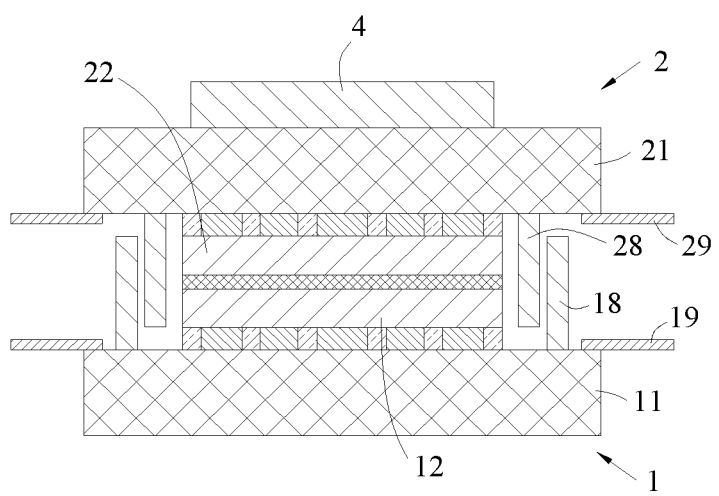
FIG. 12 illustrates a schematic diagram of another exemplary spatial light modulator consistent with disclosed embodiments of the present disclosure.

FIG. 12 illustrates a schematic diagram of another spatial light modulator consistent with disclosed embodiments of the present disclosure. Referring to FIG. 12, the spatial light modulator may further include a polarizer 4. The polarizer 4 may be located on the light-outgoing side of the spatial light modulator. For example, light may enter from the first array substrate 11 and may exit from the second array substrate 21. In view of this, the polarizer 4 may be disposed on the side of the second array substrate 21 facing away from the first array substrate 11. The polarizer 4 may adjust the intensity of the light emitted from the spatial light modulator based on the light emitted from the second array substrate 21.

In certain embodiments, the first liquid-crystal module 1 may further include a first control chip 18 and a first flexible circuit board 19 that are connected to the first array substrate 11. The first flexible circuit board 19 may be configured to connect the first control chip 18 to an external circuit. The second liquid-crystal module 2 may further include a second control chip 28 and a second flexible circuit board 29 that are connected to the second array substrate 21. The second flexible circuit board 29 may be configured to connect the second control chip 28 to an external circuit. The first control chip 18 and the second control chip 28 may be located between the first array substrate 11 and the second array substrate 21. In the stacked direction of the first array substrate 11 and the second array substrate 21, the first control chip 18 may not overlap the second array substrate 28. A thickness of the first control chip 18 and a thickness of the second control chip 28 may be substantially large. Through configuring the first control chip 18 not to overlap the second control chip 28, the spatial light modulator may be prevented from being substantially thick caused by the opposite arrangement of the first control chip 18 and the second control chip 28.

Figure 13:
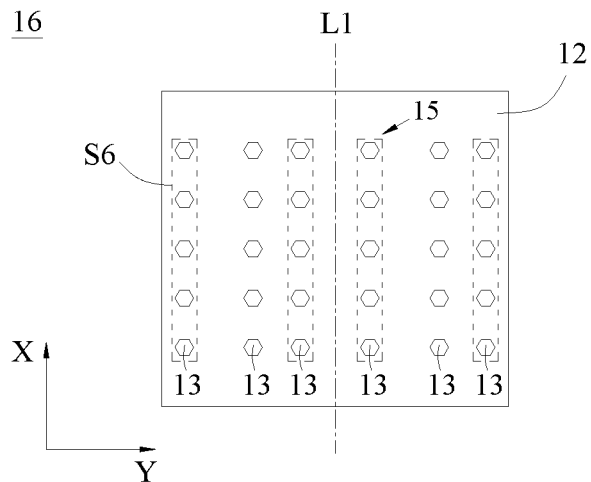
FIG. 13 illustrates a schematic diagram of projections of a first color filter substrate and a first spacer on a first array substrate of another exemplary spatial light modulator consistent with disclosed embodiments of the present disclosure.

FIG. 13 illustrates a schematic diagram of projections of the first color filter substrate and the first spacer on the first array substrate consistent with disclosed embodiments of the present disclosure. Referring to FIG. 13, the first spacers 13 in a dashed frame S6 may form the first overlapped unit 15. In certain embodiments, the orthographic projection of the first color filter substrate 12 on the first array substrate 11 may be symmetrical with respect to a first axis L1, and the orthographic projection of the first overlapped unit 15 on the first array substrate 11 may be symmetrical with respect to the first axis L1.

In one embodiment, the first axis L1 may be parallel to the first direction X. In another embodiment, the first axis L1 may be parallel to the second direction Y.

In view of this, the first color filter assembly 16 may be configured to replace the second color filter substrate 22 and the second spacers 23 in the second liquid-crystal module 2. In other words, the second color filter assembly 26 formed by the second color filter substrate 22 and the second spacers 23 may have a same structure as the first color filter assembly 16. After the second liquid-crystal module 2 is flipped along a flip axis parallel to the first axis L1 and moved to an upper side of the first liquid-crystal module 1, the first overlapped units 15 in the two first color filter assemblies 16 may overlap each other along the optical path direction, thereby reducing the area of the non-uniform display region caused by the influence of the spacer, and improving the display effect. In addition, the second color filter assembly 26 and the first color filter assembly 16 may be the same color filter assembly, which may simplify the production process of the spatial light modulator.

Figure 14:
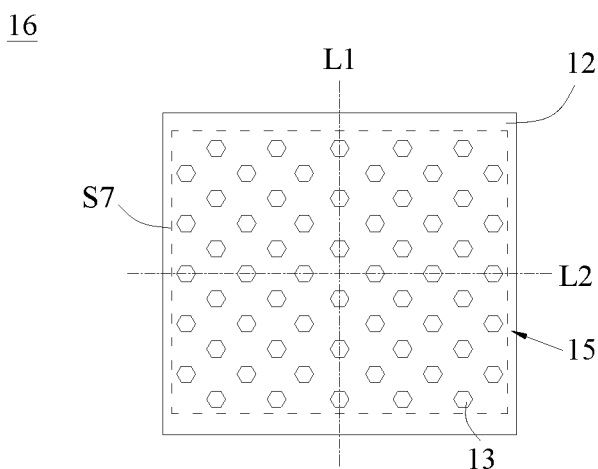
FIG. 14 illustrates a schematic diagram of projections of a first color filter substrate and a first spacer on a first array substrate of another exemplary spatial light modulator consistent with disclosed embodiments of the present disclosure.

FIG. 14 illustrates a schematic diagram of projections of the first color filter substrate and the first spacer on the first array substrate consistent with disclosed embodiments of the present disclosure. Referring to FIG. 14, the first overlapped unit 15 may include the entire first spacers 13. The first spacers 13 in the dashed frame S7 may form the first overlapped unit 15.

In certain embodiments, referring to FIG. 14, the orthographic projection of the first color filter substrate 12 on the first array substrate 11 may be symmetrical with respect to the second axis L2. The second axis L2 may be perpendicular to the first axis L1. The orthographic projection of the first overlapped unit 15 on the first array substrate 11 may be symmetrical with respect to the second axis L2.

In view of this, the first color filter assembly 16 may be configured to replace the second color filter substrate 22 and the second spacers 23 in the second liquid-crystal module 2. After the second liquid-crystal module 2 is flipped along a flip axis and moved to the upper side of the first liquid-crystal module 1, the first overlapped units 15 in the two first color filter assemblies 16 may overlap each other along the optical path direction, thereby reducing the area of the non-uniform display region caused by the influence of the spacer, and improving the display effect. The flip axis may be parallel to the first axis L1, or may be parallel to the second axis L2, thereby simplifying the assembly process of the first liquid-crystal module 1 and the second liquid-crystal module 2.

Figure 15:
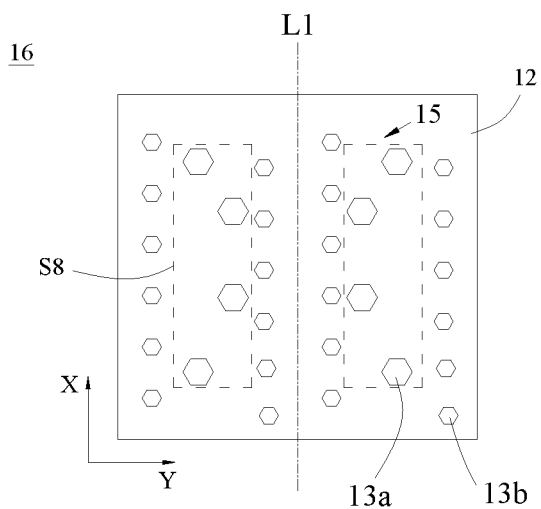
FIG. 15 illustrates a schematic diagram of projections of a first color filter substrate and a first spacer on a first array substrate of another exemplary spatial light modulator consistent with disclosed embodiments of the present disclosure.

FIG. 15 illustrates a schematic diagram of projections of the first color filter substrate and the first spacer on the first array substrate consistent with disclosed embodiments of the present disclosure. Referring to FIG. 15, the first overlapped unit 15 may include one or more first main spacers 13a. The one or more first main spacers 13a in the dashed frame S8 may form the first overlapped unit 15.

In certain embodiments, the orthographic projections of the plurality of first main spacers 13a on the first array substrate 11 may be symmetrical with respect to the first axis L1. The first color filter assembly 16 may be configured to replace the second color filter substrate 22 and the second spacers 23 in the second liquid-crystal module 2. After the second liquid-crystal module 2 is flipped along a flip axis parallel to the first axis L1 and moved to the upper side of the first liquid-crystal module 1, the first main spacers in the two first color filter assemblies 16 may overlap along the optical path direction, thereby reducing the area of the non-uniform display region caused by the influence of the spacer, and improving the display effect. In certain embodiments, the orthographic projections of the entire first main spacers 13a on the first array substrate 11 may be symmetrical with respect to the first axis L1.

Figure 16:
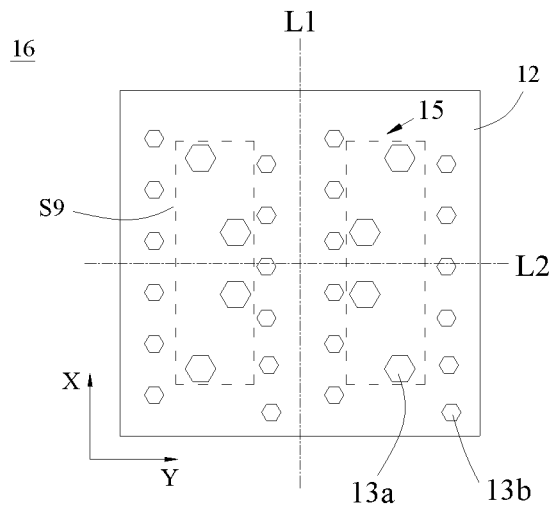
FIG. 16 illustrates a schematic diagram of projections of a first color filter substrate and a first spacer on a first array substrate of another exemplary spatial light modulator consistent with disclosed embodiments of the present disclosure.

FIG. 16 illustrates a schematic diagram of projections of the first color filter substrate and the first spacer on the first array substrate consistent with disclosed embodiments of the present disclosure. Referring to FIG. 16, the first overlapped unit 15 may include one or more first main spacers 13a. The one or more first main spacers 13a in the dashed frame S9 may form the first overlapped unit 15.

The orthographic projections of the plurality of first main spacers 13a of the first overlapped unit 15 on the first array substrate 11 may not only be symmetrical with respect to the first axis L1, but also be symmetrical with respect to the second axis L2.

Figure 17:
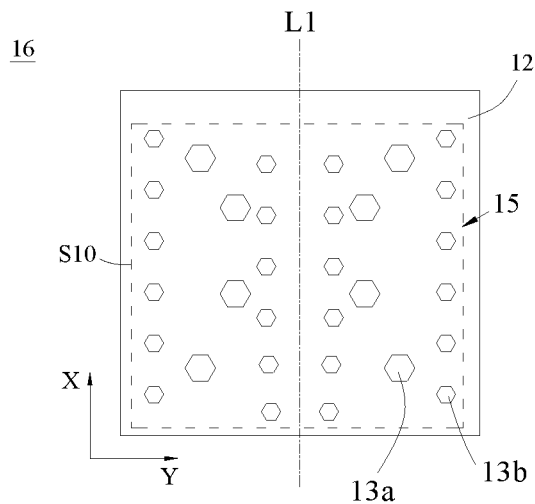
FIG. 17 illustrates a schematic diagram of projections of a first color filter substrate and a first spacer on a first array substrate of another exemplary spatial light modulator consistent with disclosed embodiments of the present disclosure.

FIG. 17 illustrates a schematic diagram of projections of the first color filter substrate and the first spacer on the first array substrate consistent with disclosed embodiments of the present disclosure. Referring to FIG. 17, the first overlapped unit 15 may include one or more first main spacers 13a and one or more first auxiliary spacers 13b. The one or more first main spacers 13a and one or more first auxiliary spacers 13b in the dashed frame S10 may form the first overlapped unit 15.

The orthographic projections of the plurality of first main spacers 13a and the plurality of first auxiliary spacers 13b on the first array substrate 11 may be symmetrical with respect to the first axis L1. The first color filter assembly 16 may be configured to replace the second color filter substrate 22 and the second spacers 23 in the second liquid-crystal module 2. After the second liquid-crystal module 2 is flipped along a flip axis parallel to the first axis L1 and moved to the upper side of the first liquid-crystal module 1, the first main spacers in the two first color filter assemblies 16 may overlap along the optical path direction, and the first auxiliary spacers in the two first color filter assemblies 16 may overlap along the optical path direction, thereby reducing the area of the non-uniform display region caused by the influence of the spacer, and improving the display effect.

Figure 18:
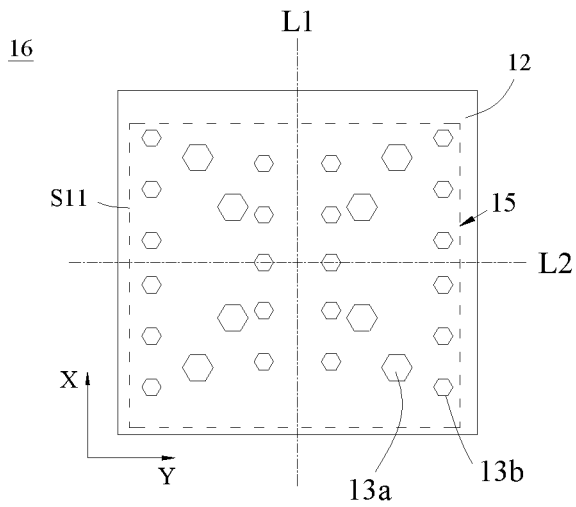
FIG. 18 illustrates a schematic diagram of projections of a first color filter substrate and a first spacer on a first array substrate of another exemplary spatial light modulator consistent with disclosed embodiments of the present disclosure.

FIG. 18 illustrates a schematic diagram of projections of the first color filter substrate and the first spacer on the first array substrate consistent with disclosed embodiments of the present disclosure. Referring to FIG. 18, the first overlapped unit 15 may include one or more first main spacers 13a and one or more first auxiliary spacers 13b. The one or more first main spacers 13a and one or more first auxiliary spacers 13b in the dashed frame S11 may form the first overlapped unit 15.

In certain embodiments, the orthographic projections of the plurality of first main spacers 13a of the first overlapped unit 15 on the first array substrate 11 may not only be symmetrical with respect to the first axis L1, but also be symmetrical with respect to the second axis L2. The orthographic projections of the plurality of first auxiliary spacers 13b of the first overlapped unit 15 on the first array substrate 11 may not only be symmetrical with respect to the first axis L1, but also be symmetrical with respect to the second axis L2.

Figure 19:
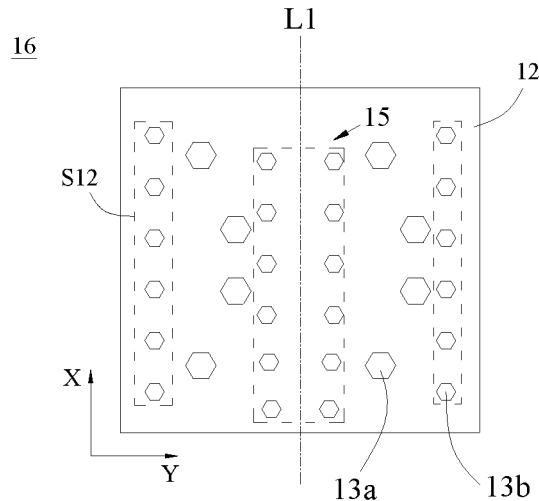
FIG. 19 illustrates a schematic diagram of projections of a first color filter substrate and a first spacer on a first array substrate of another exemplary spatial light modulator consistent with disclosed embodiments of the present disclosure.

FIG. 19 illustrates a schematic diagram of projections of the first color filter substrate and the first spacer on the first array substrate consistent with disclosed embodiments of the present disclosure. Referring to FIG. 19, the first overlapped unit 15 may include one or more first auxiliary spacers 13b. The one or more first auxiliary spacers 13b in the dashed frame S12 may form the first overlapped unit 15. The orthographic projections of the plurality of first auxiliary spacers 13b of the first overlapped unit 15 on the first array substrate 11 may be symmetrical with respect to the first axis L1. In certain embodiments, the orthographic projections of the entire first auxiliary spacers 13b on the first array substrate 11 may be symmetrical with respect to the first axis L1.

Figure 20:
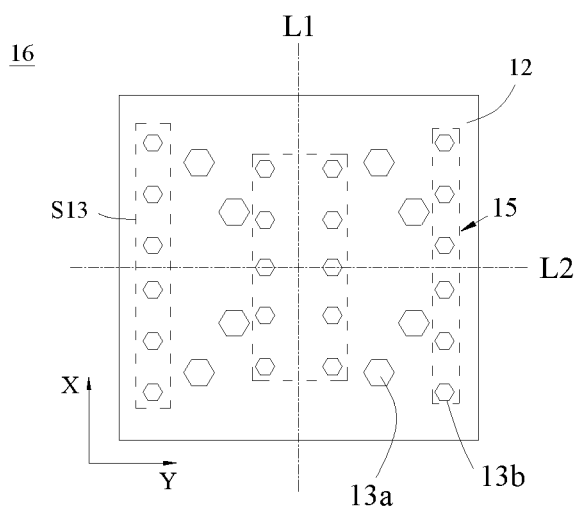
FIG. 20 illustrates a schematic diagram of projections of a first color filter substrate and a first spacer on a first array substrate of another exemplary spatial light modulator consistent with disclosed embodiments of the present disclosure.

FIG. 20 illustrates a schematic diagram of projections of the first color filter substrate and the first spacer on the first array substrate consistent with disclosed embodiments of the present disclosure. Referring to FIG. 20, the first overlapped unit 15 may include one or more first auxiliary spacers 13b. The one or more first auxiliary spacers 13b in the dashed frame S13 may form the first overlapped unit 15. The orthographic projections of the plurality of first auxiliary spacers 13b of the first overlapped unit 15 on the first array substrate 11 may not only be symmetrical with respect to the first axis L1, but also be symmetrical with respect to the second axis L2.

Figure 21:
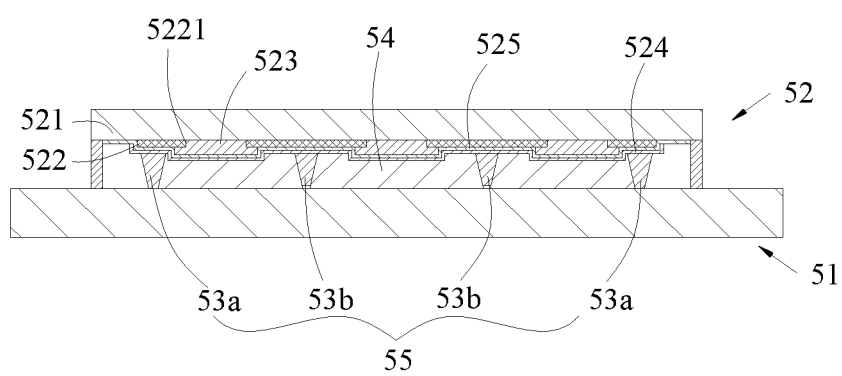
FIG. 21 illustrates a schematic diagram of an exemplary liquid-crystal module consistent with disclosed embodiments of the present disclosure.

The present disclosure also provides a liquid-crystal module. FIG. 21 illustrates a schematic diagram of a liquid-crystal module consistent with disclosed embodiments of the present disclosure. Referring to FIG. 21, the liquid-crystal module 5 may include an array substrate 51, a color filter substrate 52, and a plurality of spacers located between the array substrate 51 and the color filter substrate 52. The plurality of spacers may include one or more main spacers 53a and one or more auxiliary spacers 53b, and the main spacer 53a may have a height greater than the auxiliary spacer 53b.

The liquid-crystal module 5 may further include a liquid-crystal layer 54, and the liquid-crystal layer 54 may be disposed between the array substrate 51 and the color filter substrate 52. The main spacer 53a may be supported between the array substrate 51 and the color filter substrate 52 to maintain the thickness uniformity of the liquid-crystal layer 54 between the array substrate 51 and the color filter substrate 52. The auxiliary spacer 53b may be mainly configured to be supported between the array substrate 51 and the color filter substrate 52 when the liquid-crystal module 5 is pressed, to prevent the liquid-crystal module 5 from unrecoverable deformation.

The color filter substrate 52 may include a substrate 521, a black matrix 522, and a plurality of color resists 523. The black matrix 522 may be disposed on a side of the substrate 521 facing toward the array substrate 51, and a plurality of spacers may be disposed on a side of the black matrix 522 facing toward the array substrate 51. The orthographic projections of the plurality of spacers on the array substrate 51 may be located within the orthographic projection of the black matrix 522 on the array substrate 51. The transmitted light around the spacer may not be controlled and may not be used for display. The black matrix 522 may block the light affected by the spacer to ensure the uniformity of light emitted from the liquid-crystal module 5.

The black matrix 522 may have a plurality of pixel openings 5221, and the plurality of color resists 523 may cover the plurality of pixel openings 5221. The plurality of color resists 523 may include a red color resist block corresponding to a red pixel, a green color resist block corresponding to a green pixel, and a blue color resist block corresponding to a blue pixel. After passing through a color resist block, the light may display a corresponding color.

In certain embodiments, the color filter substrate 52 may further include a common electrode layer 524 and a protection layer 525. The protection layer 525 may be disposed on a side of the black matrix 522 facing toward the array substrate 51, and may cover the black matrix 522 and the color resists 523. The common electrode layer 524 may be disposed on the surface of the protection layer 525 facing toward the array substrate 51. In certain embodiments, the main spacer 53a and the auxiliary spacer 53b may be formed on the surface of the common electrode layer 524 facing toward the array substrate 51.

The color resist 523 may have a certain thickness, which may cause the formation of a protruded region on the surface of the common electrode layer 524. Therefore, in certain embodiments, the orthographic projections of the color resists 523 on the substrate 521 and the orthographic projections of the spacers on the substrate 521 may be alternately arranged and spaced apart. In view of this, the spacers may be capable of avoiding the protruded region, and may be arranged on the flat region of the surface of the common electrode layer 524, thereby ensuring the height consistency of the plurality of main spacers 53a and the height consistency of the plurality of auxiliary spacers 53b.

Figure 22:
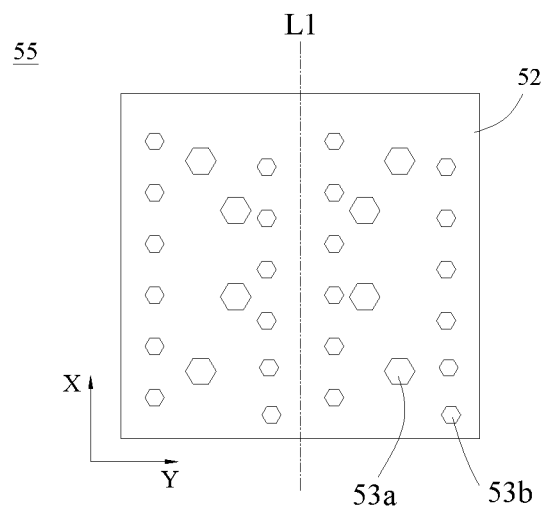
FIG. 22 illustrates a schematic diagram of projections of a color filter substrate and a spacer on an array substrate of an exemplary liquid-crystal module consistent with disclosed embodiments of the present disclosure.

FIG. 22 illustrates a schematic diagram of projections of the color filter substrate and the spacer on the array substrate consistent with disclosed embodiments of the present disclosure. Referring to FIG. 22, in the process of forming the liquid-crystal module 5, a plurality of main spacers 53a and a plurality of auxiliary spacers 53b may be first formed on the color filter substrate 52 to form a color filter assembly 55, and then the color filter assembly 55, the liquid-crystal layer 54, and the array substrate 51 may be assembled together.

The orthographic projection of the color filter substrate 52 on the array substrate 51 may be symmetrical with respect to a first axis L1, and the orthographic projections of the plurality of main spacers 53a on the array substrate 51 may be symmetrical with respect to the first axis L1.

The two liquid-crystal modules 5 in the present disclosure may be connected to form the spatial light modulator. In one embodiment, one liquid-crystal module 5 may be placed on a lower side, another liquid-crystal module 5 may be flipped along a flip axis parallel to the first axis L1 and moved to the upper side of the one liquid-crystal module 5, and then the two liquid-crystal modules 5 may be connected. The main spacers 53a of the two liquid-crystal modules 5 may overlap along the optical path direction, thereby reducing the area of the non-uniform display region caused by the influence of the main spacer 53a, and improving the display effect.

Figure 23:
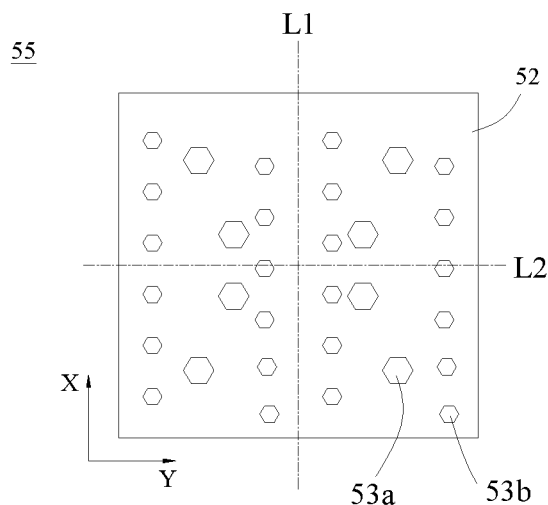
FIG. 23 illustrates a schematic diagram of projections of a color filter substrate and a spacer on an array substrate of another exemplary liquid-crystal module consistent with disclosed embodiments of the present disclosure.

FIG. 23 illustrates a schematic diagram of projections of the color filter substrate and the spacer on the array substrate consistent with disclosed embodiments of the present disclosure. Referring to FIG. 23, in certain embodiments, the orthographic projection of the color filter substrate 52 on the array substrate 51 may be symmetrical with respect to the second axis L2. The second axis L2 may be perpendicular to the first axis L1. The orthographic projections of the main spacers 53a on the array substrate 51 may not only be symmetrical with respect to the first axis L1, but also be symmetrical with respect to the second axis L2.

When forming the spatial light modulator, one liquid-crystal module 5 may be placed on a lower side, another liquid-crystal module 5 may be flipped along a flip axis and moved to the upper side of the one liquid-crystal module 5, and then the two liquid-crystal modules 5 may be connected. The flip axis may be parallel to the first axis L1, or may be parallel to the second axis L2.

Figure 24:
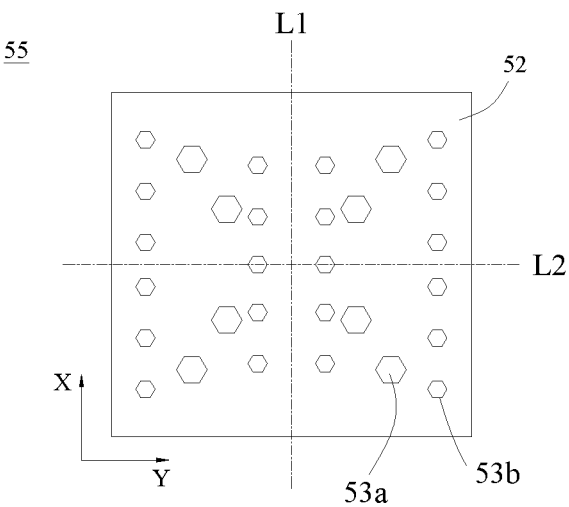
FIG. 24 illustrates a schematic diagram of projections of a color filter substrate and a spacer on an array substrate of another exemplary liquid-crystal module consistent with disclosed embodiments of the present disclosure.

FIG. 24 illustrates a schematic diagram of projections of the color filter substrate and the spacer on the array substrate consistent with disclosed embodiments of the present disclosure. Referring to FIG. 24, in certain embodiments, the orthographic projections of the auxiliary spacers 53b on the array substrate 51 may be symmetrical with respect to the first axis L1. When the two liquid-crystal modules 5 are connected together to form the spatial light modulator, the orthographic projections of the auxiliary spacers 53b of the two liquid-crystal modules 5 may overlap along the optical path direction, thereby reducing the area of the non-uniform display region caused by the influence of the spacer, and improving the display effect.

Figure 25:
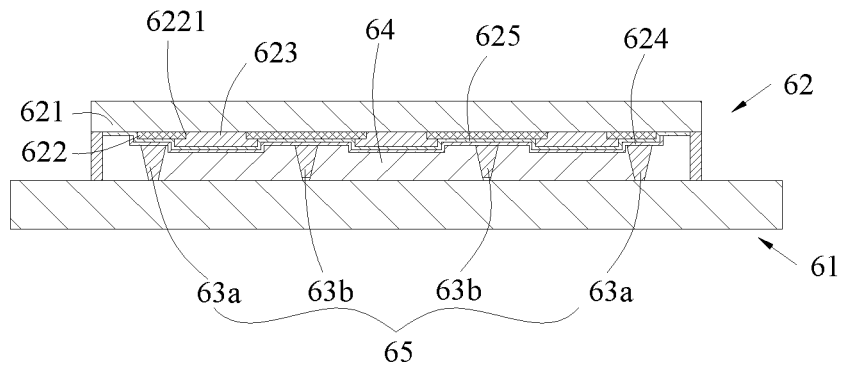
FIG. 25 illustrates a schematic diagram of another exemplary liquid-crystal module consistent with disclosed embodiments of the present disclosure.

The present disclosure also provides a liquid-crystal module. FIG. 25 illustrates a schematic diagram of a liquid-crystal module consistent with disclosed embodiments of the present disclosure. Referring to FIG. 25, the liquid-crystal module 6 may include an array substrate 61, a color filter substrate 62, and a plurality of spacers located between the array substrate 61 and the color filter substrate 62. The plurality of spacers may include one or more main spacers 63a and one or more auxiliary spacers 63b, and the main spacer 63a may have a height greater than the auxiliary spacer 63b.

The liquid-crystal module 6 may further include a liquid-crystal layer 64, and the liquid-crystal layer 64 may be disposed between the array substrate 61 and the color filter substrate 62. The main spacer 63a may be supported between the array substrate 61 and the color filter substrate 62 to maintain the thickness uniformity of the liquid-crystal layer 64 between the array substrate 61 and the color filter substrate 62. The auxiliary spacer 63b may be mainly configured to be supported between the array substrate 61 and the color filter substrate 62 when the liquid-crystal module 6 is pressed, to prevent the liquid-crystal module 6 from unrecoverable deformation.

The color filter substrate 62 may include a substrate 621, a black matrix 622, and a plurality of color resists 623. The black matrix 622 may be disposed on a side of the substrate 621 facing toward the array substrate 61, and the plurality of spacers may be disposed on a side of the black matrix 622 facing toward the array substrate 61. The orthographic projections of the plurality of spacers on the array substrate 61 may be located within the orthographic projection of the black matrix 622 on the array substrate 61. The transmitted light around the spacer may not be controlled and may not be used for display. The black matrix 622 may block the light affected by the spacer to ensure the uniformity of light emitted from the liquid-crystal module 6.

The black matrix 622 may have a plurality of pixel openings 6221, and the plurality of color resists 623 may cover the plurality of pixel openings 6221. The plurality of color resists 623 may include a red color resist block corresponding to a red pixel, a green color resist block corresponding to a green pixel, and a blue color resist block corresponding to a blue pixel. After passing through a color resist block, the light may display a corresponding color.

In certain embodiments, the color filter substrate 62 may further include a common electrode layer 624 and a protection layer 625. The protection layer 625 may be disposed on a side of the black matrix 622 facing toward the array substrate 61, and may cover the black matrix 622 and the color resist 623. The common electrode layer 624 may be disposed on the surface of the protection layer 625 facing toward the array substrate 61. In certain embodiments, the main spacer 63a and the auxiliary spacer 63b may be formed on the surface of the common electrode layer 624 facing toward the array substrate 61.

The color resist 623 may have a certain thickness, which may cause the formation of a protruded region on the surface of the common electrode layer 624. Therefore, in certain embodiments, the orthographic projections of the color resists 623 on the substrate 621 and the orthographic projections of the spacers on the substrate 621 may be alternately arranged and spaced apart. In view of this, the spacers may be capable of avoiding the protruded region, and may be arranged on the flat region of the surface of the common electrode layer 624, thereby ensuring the height consistency of the plurality of main spacers 63a and the height consistency of the plurality of auxiliary spacers 63b.

Figure 26:
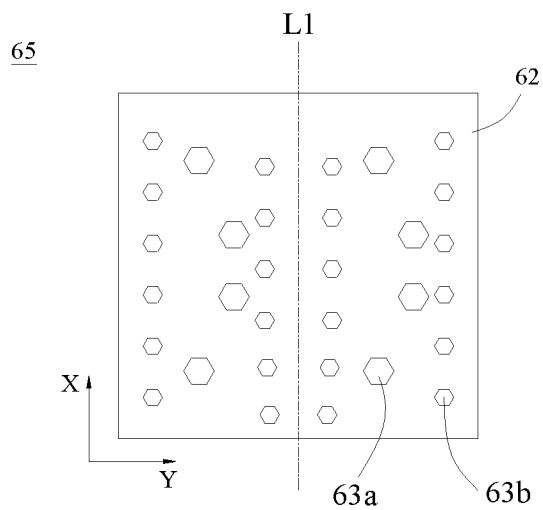
FIG. 26 illustrates a schematic diagram of projections of a color filter substrate and a spacer on an array substrate of another exemplary liquid-crystal module consistent with disclosed embodiments of the present disclosure.

FIG. 26 illustrates a schematic diagram of projections of the color filter substrate and the spacer on the array substrate consistent with disclosed embodiments of the present disclosure. Referring to FIG. 26, in the process of forming the liquid-crystal module 6, a plurality of main spacers 63a and a plurality of auxiliary spacers 63b may be first formed on the color filter substrate 62 to form a color filter assembly 65, and then the color filter assembly 65, the liquid-crystal layer 64, and the array substrate 61 may be assembled together.

The orthographic projection of the color filter substrate 62 on the array substrate 61 may be symmetrical with respect to a first axis L1, and the orthographic projections of the plurality of auxiliary spacers 63b on the array substrate 61 may be symmetrical with respect to the first axis L1.

The two liquid-crystal modules 6 in the present disclosure may be connected to form the spatial light modulator. In one embodiment, one liquid-crystal module 6 may be placed on a lower side, another liquid-crystal module 6 may be flipped along a flip axis parallel to the first axis L1 and moved to the upper side of the one liquid-crystal module 6, and then the two liquid-crystal modules 6 may be connected. The auxiliary spacers 63b of the two liquid-crystal modules 6 may overlap along the optical path direction, thereby reducing the area of the non-uniform display region caused by the influence of the spacer, and improving the display effect.

Figure 27:
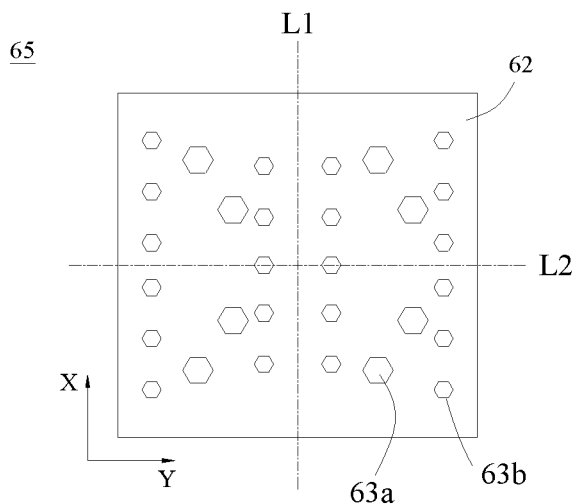
FIG. 27 illustrates a schematic diagram of projections of a color filter substrate and a spacer on an array substrate of another exemplary liquid-crystal module consistent with disclosed embodiments of the present disclosure.

FIG. 27 illustrates a schematic diagram of projections of the color filter substrate and the spacer on the array substrate consistent with disclosed embodiments of the present disclosure. Referring to FIG. 27, in certain embodiments, the orthographic projection of the color filter substrate 62 on the array substrate 61 may be symmetrical with respect to the second axis L2. The second axis L2 may be perpendicular to the first axis L1. The orthographic projections of the auxiliary spacers 63b on the array substrate 61 may not only be symmetrical with respect to the first axis L1, but also be symmetrical with respect to the second axis L2.

When preparing the spatial light modulator, one liquid-crystal module 6 may be placed on a lower side, another liquid-crystal module 6 may be flipped along a flip axis and moved to the upper side of the one liquid-crystal module 6, and then the two liquid-crystal modules 6 may be connected. The flip axis may be parallel to the first axis L1, or may be parallel to the second axis L2.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A spatial light modulator, comprising:
a first liquid-crystal module and a second liquid-crystal module that are arranged opposite to each other, wherein:
the first liquid-crystal module includes a first array substrate, a first color filter substrate, a first liquid-crystal layer, and a plurality of first spacers, wherein the first liquid-crystal layer and the plurality of first spacers are disposed between the first array substrate and the first color filter substrate,
the second liquid-crystal module includes a second array substrate, a second color filter substrate, a second liquid-crystal layer, and a plurality of second spacers, wherein the second liquid-crystal layer and the plurality of second spacers are disposed between the second array substrate and the second color filter substrate,
the first array substrate, the first liquid-crystal layer, the first color filter substrate, the second color filter substrate, the second liquid-crystal layer, and the second array substrate are stacked sequentially,
at least one first spacer of the plurality of first spacers forms a first overlapped unit, at least one second spacer of the plurality of second spacers forms a second overlapped unit, and an orthographic projection of the first overlapped unit on the first array substrate fully overlaps an orthographic projection of the second overlapped unit on the first array substrate,
an orthographic projection of the first color filter substrate on the first array substrate is symmetrical with respect to a first axis,
the orthographic projection of the first overlapped unit on the first array substrate is symmetrical with respect to the first axis,
the orthographic projection of the first color filter substrate on the first array substrate is further symmetrical with respect to a second axis, wherein the second axis is perpendicular to the first axis, and
the orthographic projection of the first overlapped unit on the first array substrate is further symmetrical with respect to the second axis.

2. The spatial light modulator according to claim 1, wherein:
a quantity of the at least one first spacer for forming the first overlapped unit is equal to a quantity of the plurality of first spacers disposed between the first array substrate and the first color filter substrate.

3. The spatial light modulator according to claim 2, wherein:
the quantity of the plurality of first spacers is equal to a quantity of the plurality of second spacers.

4. The spatial light modulator according to claim 3, wherein:
the plurality of first spacers and the plurality of second spacers are symmetrically arranged with respect to a plane, wherein the plane is parallel to the first array substrate and is located right in a middle between the first array substrate and the second array substrate.

5. The spatial light modulator according to claim 1, wherein:

the plurality of first spacers include one or more first main spacers and one or more first auxiliary spacers, wherein a first main spacer of the one or more first main spacers has a height greater than a first auxiliary spacer of the one or more first auxiliary spacers; and
the first overlapped unit includes the first main spacer.

6. The spatial light modulator according to claim 5, wherein:
the first overlapped unit includes the first auxiliary spacer.

7. The spatial light modulator according to claim 1, wherein:
the first color filter substrate includes a first substrate and a first black matrix, wherein the first black matrix is disposed on a side of the first substrate facing toward the first array substrate, and the plurality of first spacers are disposed on a side of the first black matrix facing toward the first array substrate; and
orthographic projections of the plurality of first spacers on the first array substrate are located within an orthographic projection of the first black matrix on the first array substrate, and orthographic projections of the plurality of second spacers on the first array substrate are located within the orthographic projection of the first black matrix on the first array substrate.

8. The spatial light modulator according to claim 7, wherein:
the first black matrix has a plurality of pixel openings, and the first color filter substrate further includes a plurality of first color resists covering the plurality of pixel openings; and
orthographic projections of the plurality of first color resists on the first substrate and orthographic projections of the plurality of first spacers on the first substrate are alternately arranged and spaced apart.

9. The spatial light modulator according to claim 1, wherein:
the first color filter substrate and the second color filter substrate are in contact with opposite sides of an optical adhesive layer.

10. The spatial light modulator according to claim 1, wherein:
the first array substrate, the first liquid-crystal layer, the first color filter substrate, the second color filter substrate, the second liquid-crystal layer, and the second array substrate are stacked sequentially in a direction parallel to an optical path direction, wherein light, that enters from one of the first and second array substrates, exits from another one of the first and second array substrates.

11. The spatial light modulator according to claim 1, further comprising:
a first control chip and a first flexible circuit board connected to the first array substrate; and
a second control chip and a second flexible circuit board connected to the first array substrate.

12. The spatial light modulator according to claim 11, wherein the first control chip and the second control chip are located between the first array substrate and the second array substrate, and the first control chip does not overlap the second control chip.

13. A spatial light modulator, comprising: a first liquid-crystal module and a second liquid-crystal module that are arranged opposite to each other, wherein: the first liquid-crystal module includes a first array substrate, a first color filter substrate, and a plurality of first spacers disposed between the first array substrate and the first color filter substrate, the second liquid-crystal module includes a second array substrate, a second color filter substrate, and a plurality of second spacers disposed between the second array substrate and the second color filter substrate, the first array substrate, the first color filter substrate, the second color filter substrate, and the second array substrate are stacked sequentially, and at least one first spacer of the plurality of first spacers forms a first overlapped unit, at least one second spacer of the plurality of second spacers forms a second overlapped unit, and an orthographic projection of the first overlapped unit on the first array substrate fully overlaps an orthographic projection of the second overlapped unit on the first array substrate, wherein: in the first overlapped unit, multiple first spacers of the plurality of first spacers are arranged along a first direction to form a first spacer row, and a plurality of first spacer rows are arranged and spaced apart along a second direction, wherein the second direction is perpendicular to the first direction; and at least part of first spacers of adjacent two first spacer rows of the plurality of first spacer rows are staggered along the first direction.

* * * * *